Patented July 12, 1927.

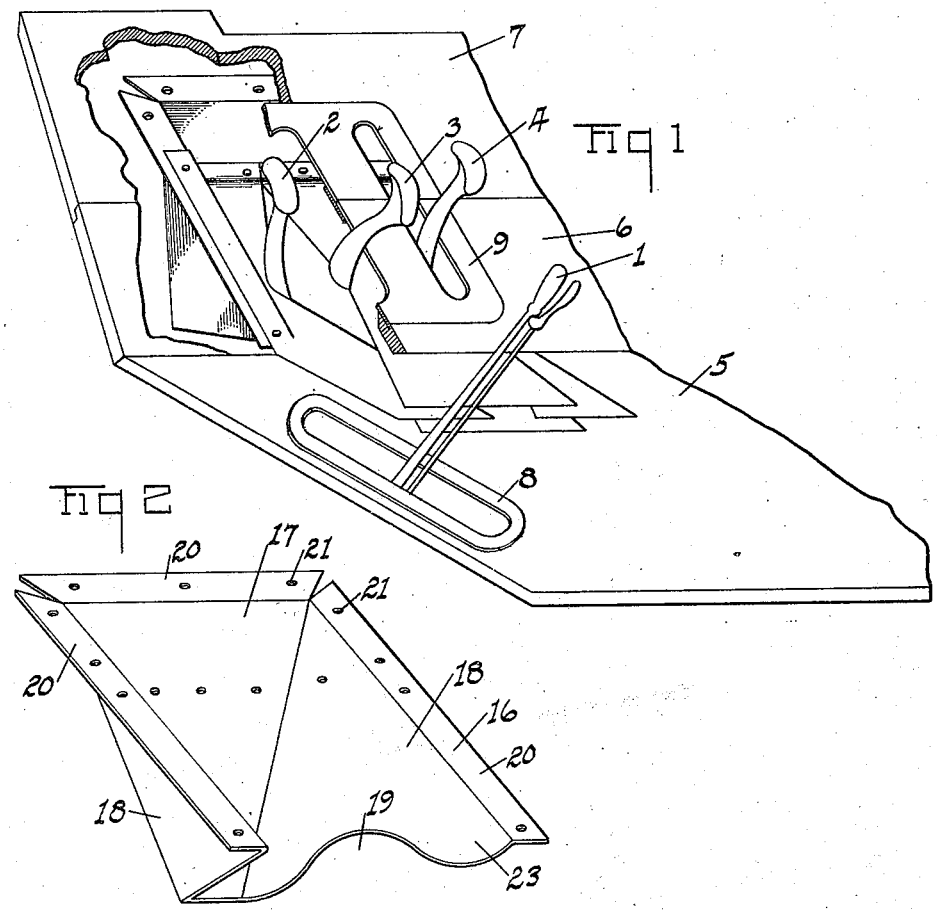

1,635,329

UNITED STATES PATENT OFFICE.

ULUS S. KLOTZ, OF TOLEDO, OHIO.

WIND GUARD FOR AUTOMOBILE LEVERS.

Application filed November 30, 1923. Serial No. 677,892.

My invention has for its object to provide an efficient flexible wind guard for levers that extend through the floors of automobiles to prevent the entry of air, commonly called wind while the car is moving, through slots in the flooring in which the levers are located and which is so constructed that the floor boards or parts may be readily lifted from the levers and replaced without destroying the efficiency of the wind guard.

To illustrate a practical application of the invention, I have selected a wind guard containing the invention and shall describe it hereinafter. The guard selected as example is shown in the accompanying drawings and is described hereinafter.

Fig. 1 of the drawings illustrates the guards in position, parts of the floor boards being shown broken away. Fig. 2 is a perspective view of the guard particularly adapted to a Ford automobile.

The guard is shown as being applied to a Ford automobile which has the emergency brake lever 1, the speed pedal 2, reverse pedal 3 and the brake pedal 4. The levers, that is, the emergency brake lever and the pedal levers extend through slots or openings formed in the floor boards 5, 6 and 7. The edges of the slots are protected by means of slotted frames 8 and 9. The wind guard is located below the floor boards and is so constructed that it may be, together with the floor boards, readily placed over the upper ends of the pedal levers.

To guard the pedal levers a wind break 16 may be provided. The wind guard 16 consists of a sheet metal piece that may be bent so as to cover the forward edges of the pedals. It has a front substantially vertical end 17 and sloping sides 18, one of the sides being cut away as at 19 to permit the wind guard to set up against or close to the engine casing of the automobile and so that the guard may enclose the brake pedal as well as the other pedals on the windward and engine sides and yet so as not to interfere with the operation of the brake pedal. The wind guard is also provided with flanges 20 whereby the wind guard may be secured to the upper floor board 7 by nails or screws that may be inserted through holes 21. The flange 20 extends laterally from the sides of the wind guard and in the plane of the under side of the upper floor board 7 and secured thereto by screws. The floor board and the guard may be easily removed and replaced without disconnecting or connecting of the parts. The wind guard being constructed so as to flare outwards and upwards prevents upward suction or draft. The shape of the guard is designed to prevent movement of air downward when the car is moving comparatively fast and if any movement of air is induced at all it is drawn downward or outward and thus preventing entrance of dust or dampness or snow into the car.

I claim:—

1. In a wind guard for Ford automobile pedal lever slots, a sheet metal member having thereon sides that slope relative to each other and so as to cover the lower ends of the pedals on three sides, two of the sides flaring outward, the forward side formed substantially V-shaped, the said guard having a flange extending around the upper edge thereof and located in the plane of the surface of the under side of the sloping upper floor board, and means extending through the said flange for securing the wind guard to the under side of the upper floor board.

2. In a wind guard for Ford automobile pedal lever slots, a sheet metal member having thereon sides that slope relative to each other and so as to cover the lower ends of the pedals on three sides, two of the sides flaring outward, the forward side formed substantially V-shaped, the said guard having a flange extending around the upper edge thereof and located in the plane of the surface of the under side of the sloping upper floor board, and means extending through the said flange for securing the wind guard to the under side of the upper floor board, one of the sides having an ogee shaped edge for fitting the rear end of the Ford engine casing.

3. The combination with the footboard of a vehicle composed of a plurality of sections having a slot extending into each of said sections, and an operating lever passing through said slot, of a unitary, rigidly formed shield having a front meeting at its upper end the upper footboard section, said front being inclined downwardly away from said sections, said shield being connected to one of said sections and the front of said shield being disposed forwardly of said levers and free of the other sections.

In testimony whereof I have hereunto signed my name to this specification.

ULUS S. KLOTZ.